United States Patent
Allen et al.

(10) Patent No.: US 7,878,745 B2
(45) Date of Patent: Feb. 1, 2011

(54) U-NUT FASTENER AND COLLATED STRIP THEREOF

(75) Inventors: Anthony A. Allen, Lafayette, TN (US); Don Hinson, Gallatin, TN (US); John M. Kosidlo, White Lake, MI (US); Douglas W. Johnson, Gallatin, TN (US); Troy D. Carman, Bethpage, TN (US)

(73) Assignee: Illinois Tool Works Inc., Glenview, IL (US)

( * ) Notice: Subject to any disclaimer, the term of this patent is extended or adjusted under 35 U.S.C. 154(b) by 78 days.

(21) Appl. No.: 12/424,728

(22) Filed: Apr. 16, 2009

(65) Prior Publication Data

US 2009/0311071 A1  Dec. 17, 2009

Related U.S. Application Data

(60) Provisional application No. 61/061,703, filed on Jun. 16, 2008.

(51) Int. Cl.
*F16B 37/02* (2006.01)
*B65D 85/24* (2006.01)

(52) U.S. Cl. ........................................ 411/175; 206/338

(58) Field of Classification Search ................. 411/174, 411/175; 206/338, 340, 341
See application file for complete search history.

(56) References Cited

U.S. PATENT DOCUMENTS

| | | | | |
|---|---|---|---|---|
| 3,426,818 A | * | 2/1969 | Derby | 411/175 |
| 3,672,738 A | * | 6/1972 | Buttriss | 312/71 |
| 3,742,577 A | * | 7/1973 | Buttriss | 29/811.2 |
| 4,062,087 A | * | 12/1977 | Lingle | 403/188 |
| 4,243,086 A | * | 1/1981 | Kuttler et al. | 411/174 |
| 4,396,326 A | * | 8/1983 | McKinnie et al. | 411/103 |
| 4,729,706 A | * | 3/1988 | Peterson et al. | 411/175 |
| 4,798,507 A | * | 1/1989 | Olah | 411/175 |
| 4,897,005 A | * | 1/1990 | Peterson et al. | 411/175 |
| 5,423,646 A | * | 6/1995 | Gagnon | 411/184 |
| 6,450,747 B1 | * | 9/2002 | Fischer | 411/174 |

\* cited by examiner

*Primary Examiner*—David Reese
(74) *Attorney, Agent, or Firm*—Mark W. Croll; Paul F. Donovan

(57) ABSTRACT

A stackable U-nut fastener includes first and second spaced arms and a folded edge portion interconnecting the arms. A plurality of U-nut fasteners can be engaged one with another to form a collated strip of fasteners. A collating tab from one arm of one U-nut fasteners engages an opening in an arm of an adjacent U-nut fastener.

15 Claims, 2 Drawing Sheets

U-NUT FASTENER AND COLLATED STRIP THEREOF

CROSS-REFERENCE TO RELATED APPLICATIONS

The present application claims the benefits of U.S. Provisional Application Ser. No. 61/061,703, filed Jun. 16, 2008.

FIELD OF THE INVENTION

The present invention relates generally to fasteners, and more particularly to a U-nut fastener adapted to be mounted upon edge portions of panels, plates, or the like, and wherein each U-nut fasteners is structured to permit a plurality of U-nut fasteners to be nested, stacked, or collated whereby the fasteners are able to be used as a strip of fasteners within the magazine of a tool for serially applying the fasteners to the edge portion of the mounting plate, panel, or the like

BACKGROUND OF THE INVENTION

U-nut fasteners are used in the automotive and other industries for mounting various components, such as, for example, modules, door panels, bumper components such as fascia, and the like, upon underlying support panels or structures, plates, beams, and the like. U-nut fasteners are known to comprise a U-shaped spring clip of connected first and second arms, with a flexibly resilient annular hoop or retainer ring, having a central aperture, partially sheared from a first one of the arms; and an internally threaded sleeve or nut member integrally formed upon the other one of the arms of the U-shaped spring clip. The U-nut is mounted on one component, such as a support panel or plate, and is held thereon by the resilient annular hoop member biased against one side of the component, the other side of which rests against the inner surface of the second arm of the U-nut. The threaded sleeve or nut member threadedly receives a threaded bolt or similar type fastener which is passed through an aperture defined within a second component, whereby the U-nut and bolt fasteners can be fixedly secured together so as to in turn secure the two components one to the other.

U-nuts can be mounted upon a support panel or plate by inserting an edge portion of the support panel or plate into the space defined between the two arms of the U-nut fastener, and subsequently sliding the U-nut fastener onto the support panel or plate until the flexibly resilient annular hoop or retainer ring engages and becomes seated within a hole defined within the support panel or plate. The second one of the arms of the U-nut can be provided with an upwardly bent forward edge or lip portion to facilitate insertion of an edge portion of the support panel or plate between the two arms of the U-nut. The central aperture formed within the first arm of the U-nut, defining the annular hoop or retainer ring inner periphery, also permits passage therethrough of the bolt fastener, and serves to somewhat guide the bolt fastener into engagement with the internally threaded sleeve or nut member formed upon the second arm of the U-nut It is has been known to distribute and use U-nuts as individual components randomly gathered in a container. Assemblers are required to handle each U-nut individually while manually installing the U-nuts in an assembly. The structure of U-nut fasteners can result in the interlocking or entanglement of such fasteners when randomly accumulated in a box or other storage or shipping container. Interlocking or entanglement of the fasteners prevents efficient packaging of the fasteners, and inhibits efficient and rapid use of such fasteners during installation procedures when the interlocked or entangled fasteners must first be unlocked or disentangled from each other.

U.S. Pat. No. 6,450,747 describes a U-nut fastener which permits and facilitates stacking or nesting of such fasteners into a collated strip. The internal diameter or diametrical extent of the central aperture defined within the annular hoop or retainer ring is substantially the same as the external diametrical extent of the internally threaded sleeve or nut member such that the annular hoop or retainer ring of a first U-nut fastener can be fitted upon or over the upstanding threaded sleeve or nut member of a second U-nut fastener, whereby the fasteners can be nested or stacked in an array or collated strip. U.S. Pat. No. 6,711,809 describes a tool that can be used for installing individual U-nuts from a collated strip of the U-nuts.

Collated U-nuts as described have achieved benefits and advantages, but also have some limitations. For example, the design is less suitable for U-nuts of thinner materials than for U-nuts of thicker materials. Further, when the use requires deformation of the threaded sleeve or nut to establish prevailing torque characteristics, it can be difficult to maintain the required dimensional tolerances to achieve engagement of one U-nut to another in the stacked arrangement.

SUMMARY OF THE INVENTION

The present invention provides a U-nut with first and second spaced arms configured so that a stacked array of the U-nuts includes engagement of the second arm of one U-nut with the first arm of an adjacent U-nut. The engaging structure includes a collating tab on one arm of one U-nut extended into an aperture in an arm of an adjacent U-nut in a collated strip or stacked array of the U-nuts.

In one aspect of a form thereof, the present invention provides a U-nut fastener connectable within a stacked array of U-nut fasteners. The U-nut fastener has a first arm; a second arm and a folded edge portion integrally interconnecting the first arm and the second arm such that the first arm, the second arm and the edge portion together provide the fastener with a U-shaped configuration. Connecting structure provided upon the U-nut fastener for enabling a first U-nut fastener to be lockingly nested together with a second U-nut fastener in a stacked array includes first structure defined upon the first arm and second structure defined upon the second arm for locked accommodation of a first U-nut fastener to a second U-nut fastener in a stacked array when the first structure of a first U-nut fastener is lockingly engaged with the second structure of a second U-nut fastener. The connecting structure has the first arm defining an opening; and the second arm defining an angled collating tab, the angled collating tab being substantially aligned with the opening so that a stacked array of such U-nut fasteners includes the collating tab of one of the U-nut fasteners extending into the opening of an adjacent U-nut fastener and being engaged there with.

In another aspect of a form thereof, the present invention provides a U-nut fastener connectable within a stacked array of U-nut fasteners, with a first arm; a second arm and a folded edge portion integrally interconnecting the first arm and the second arm such that the first arm, the second arm and the edge portion together provide the fastener with a U-shaped configuration. A retainer ring is integrally formed upon the first arm, and an upstanding nut member is integrally formed upon the second arm. Connecting structures provided upon the first and second arms for enabling a first U-nut fastener to be lockingly nested together with a second U-nut fastener in a stacked array, includes structures defined at distal outer ends of the first and second arms, an opening defined in one of the arms, and a collating tab extending angularly from the other of the arms.

In a further aspect of a form thereof, the present invention provides a stacked array of U-nut fasteners with a first U-nut fastener and a second U-nut fastener lockingly nested together. Each one of the first and second U-nut fasteners has a first arm, a second arm and a folded edge portion integrally interconnecting the first arm thereof and the second arm thereof such that the first arm, the second arm and the folded edge portion together provide the fastener with a U-shaped configuration. Each one of the first and second U-nut fasteners has a threaded nut member in one of the first and second arms thereof and an aperture in the other of the first and second arms thereof aligned with the nut member thereof. An opening is defined in the first arm of the first U-nut fastener; and a collating tab extends angularly from the second arm of the second U-nut fastener, the collating tab being lockingly received in the opening of the first U-nut fastener.

An advantage of the U-nuts disclosed herein, in at least one form thereof, is providing structure is for interconnecting U-nuts without affecting structural relationships of portions thereof requiring tight manufacturing tolerances.

Another advantage of the U-nuts disclosed herein, in at least one form thereof, is providing stackable U-nuts that can be made of thin material.

Other features and advantages of the invention will become apparent to those skilled in the art upon review of the following detailed description, claims and drawings in which like numerals are used to designate like features.

Figure 1:
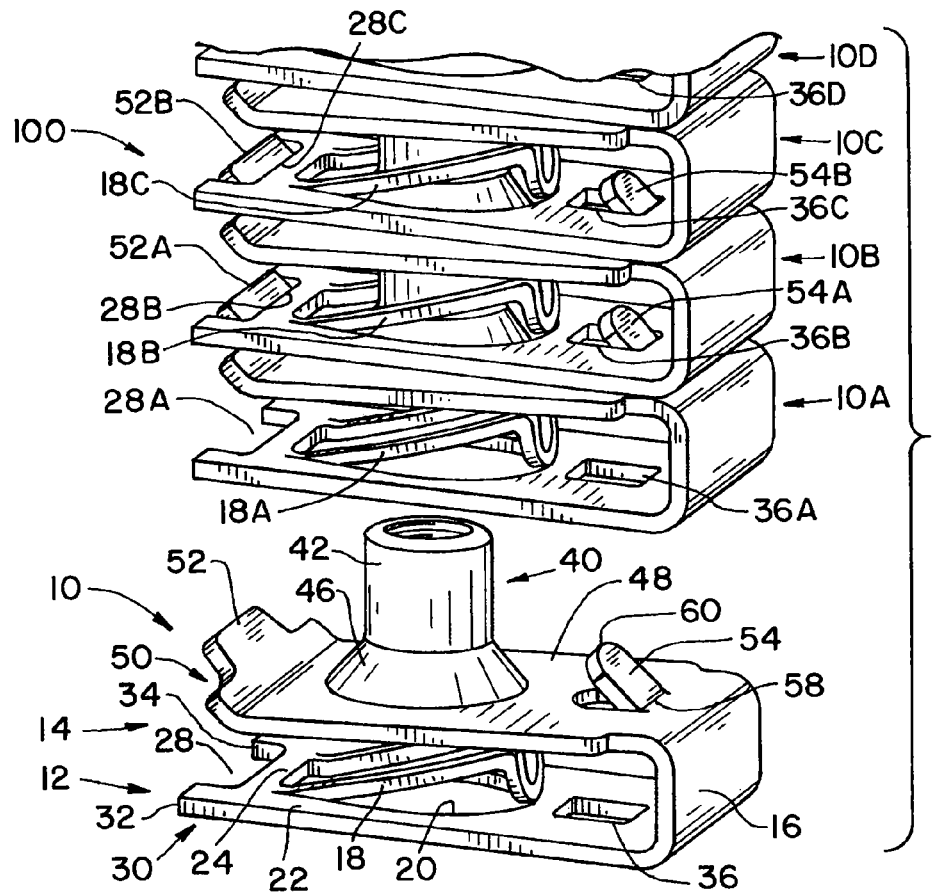
FIG. 1 is a fragmentary perspective view of a stack or collated strip of four U-nut fasteners, with a fifth individual U-nut fastener separated from the stack, all of the U-nut fasteners being constructed in accordance with the principles and teachings of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
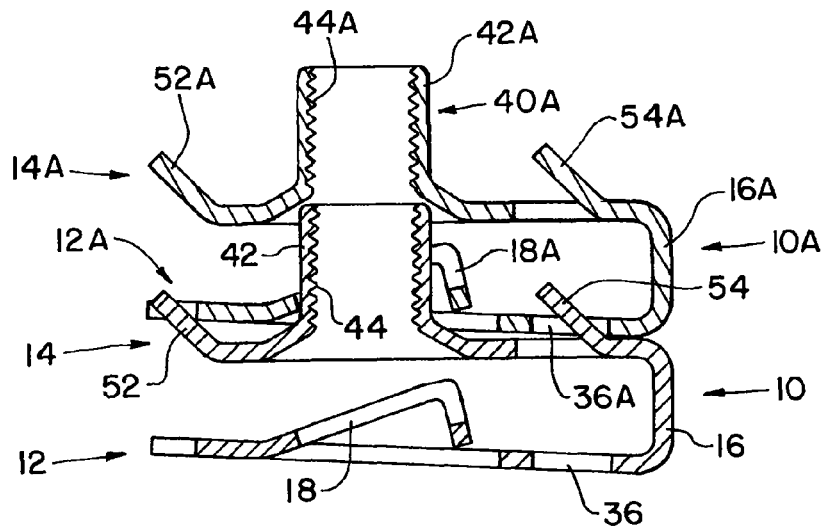
FIG. 2 is a cross-sectional view through a pair of U-nut fasteners constructed in accordance with the principles and teachings of the present invention, wherein the pair of U-nut fasteners are shown in a vertically stacked or nested array.
Figure 4:
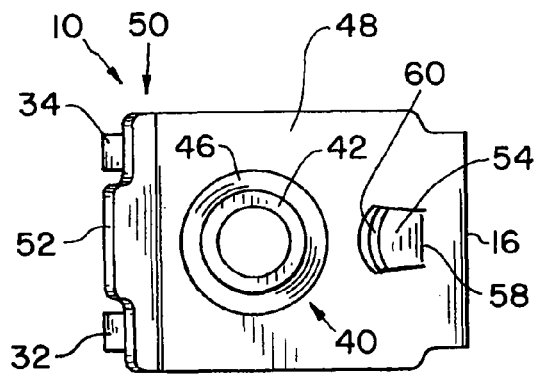
FIG. 4 is a plan view of a U-nut fastener constructed in accordance with the principles and teachings of the present invention.
Figure 5:
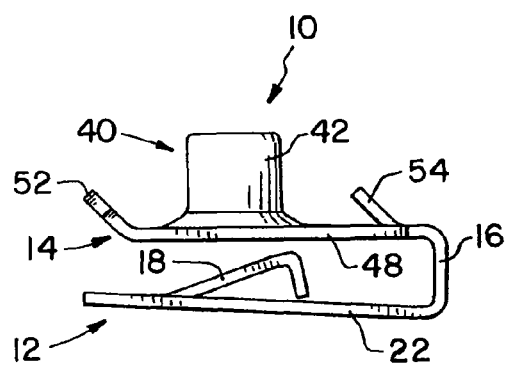
FIG. 5 is a side elevational view of the U-nut fastener shown in FIG. 4.
Figure 6:
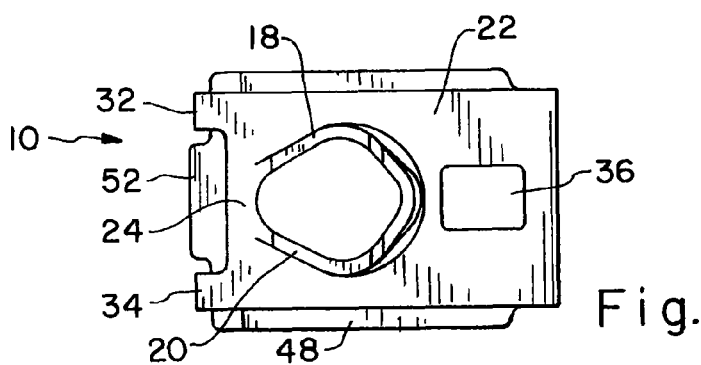
FIG. 6 is a plan view of the U-nut fastener shown in FIGS. 4 and 5, illustrating the opposite face of the fastener from that shown in FIG. 4.

Referring now more specifically to the drawings and to FIG. 1 in particular, a U-nut fastener constructed in accordance with the principles and teachings of the present invention is disclosed and is generally indicated by the reference character 10. In FIG. 1, U-nut fastener 10 is shown separate from a collated strip 100 of U-nut fasteners 10A, 10B, 10C and 10D. FIG. 2 illustrates U-nut fastener 10 attached to fastener 10A.

It should be understood that all of the U-nut fasteners 10, 10A, 10B, 10C and 10D are substantially identical. Accordingly, only U-nut fastener 10 will be described in detail herein. Components and features of U-nut fasteners 10A, 10B, 10C and 10D that are similar to the components and features described for U-nut fastener 10 will be identified with a similar reference numeral but having the suffix letter A, B, C or D applied thereto.

It should be understood further that collated strip 100 can be provided with many more U-nut fasteners than shown, for use in a tool operated manually or automatically to install individual U-nuts in an assembly. More particularly, in accordance with the principles and teachings of the present invention, a collated strip 100 of U-nut fasteners of the present invention may comprise, for example, several dozen U-nut fasteners forming a stacked or nested array of U-nut fasteners 10 which may be utilized in a fastener magazine within a fastener installation tool.

Figure 3:
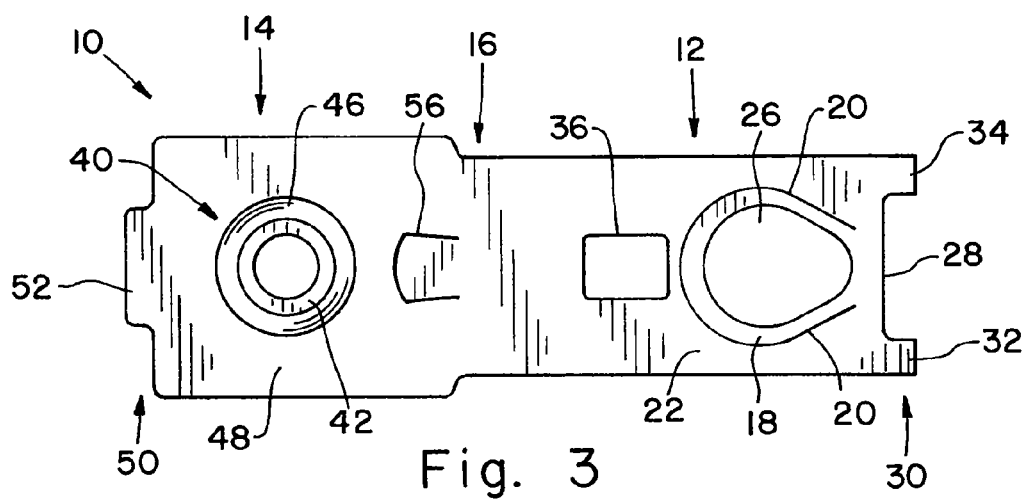
FIG. 3 is a top plan view of a U-nut fastener constructed in accordance with the principles and teachings of the present invention, and as disclosed within FIGS. 1 and 2, except that the fastener is illustrated in its form prior to folding the same substantially in half upon itself so as to finalize formation of the fastener into its U-shaped configuration.

U-nut fastener 10 includes a first arm 12, a second arm 14, and an intermediate folded edge portion 16 integrally interconnecting first and second arms 12, 14 such that fastener 10 has a substantially U-shaped configuration, with first and second arms 12, 14 disposed substantially parallel to each other. Fastener 10 can be fabricated by means of suitable extrusion or stamping operations from a sheet metal blank of the desired metal material so as to have an original unfolded form as seen in FIG. 3, which is subsequently folded to form the U-shaped configuration.

An annular hoop member or retainer ring 18 is partially severed as at cut 20 from a main or primary arm portion 22 of first arm 12 such that annular hoop member or retainer ring 18 is flexibly and integrally connected to main or primary arm portion 22 of first arm 12 by means of a hinge portion 24. Annular hoop member or retainer ring 18 has a central aperture 26 defined therein, and is normally disposed in an inclined mode at a predetermined angle with respect to the inner surface of main or primary arm portion 22, angling into the space defined between first arm 12 and second arm 14. Annular hoop member or retainer ring 18 is provided for a purpose to be discussed more particularly hereinafter in connection with the mounting of U-nut fastener 10 upon an edge portion of a support plate or panel, (not shown).

First arm 12 is provided further with a recessed cut-out region 28 defined within the distal end or forward edge portion 30 thereof. Recessed cutout region 28 thereby establishes and defines projections 32, 34 along opposite sides of forward edge portion 30. Recessed cut-out region 28 and projections 32, 34 defined thereby are provided for a purpose which also will be discussed more particularly hereinafter in connection with the stacking or nesting of a plurality of U-nut fasteners when forming an array or collated strip of the U-nut fasteners for packaging and use within a suitable installation tool.

An opening 36 is defined in primary arm portion 22 within the area of primary arm portion 22 between annular hoop or retainer ring 18 defined by cut 20 and the connection of primary arm portion 22 to folded edge portion 16. Opening 36 is provided for cooperating with structure to be defined hereinafter on a second arm of another U-nut for stacking a plurality of U-nuts into a collated strip.

Second arm 14 is provided with an internally threaded, upwardly projecting nut member 40 including a cylindrical sleeve 42 and an internal thread 44 within sleeve 42. Nut member 40 is substantially aligned axially with aperture 26 defined within annular hoop member or retainer ring 18 so as to accommodate a threaded bolt fastener, not shown, installed through annular hoop member or retainer ring 18 to threadedly engage nut member 40. A frusto-conical member 46 integrally connects the end portion of sleeve 42 to a main or primary arm portion 48 of second arm 14, to properly distribute the threaded load applied to the fastener.

Second arm 14 also is provided at its distal end or forward edge portion 50 with an upwardly inclined latch projection 52 which is adapted to mate with the recessed cutout region 28 of a first arm 12 of another U-nut fastener 10 when a plurality of U-nut fasteners 10 are nested or collated together in a stacked array or collated strip. Latch projection 52 extends into the recessed cutout portion 28 between projections 32, 34 of the U-nut fastener to which it is attached within the collated strip.

A collating tab 54 is partially severed as at a cut 56 from main or primary arm portion 48 of second arm 14, such that collating tab 54 is flexibly and integrally connected to main or primary arm portion 48 of second arm 14 by means of a hinge portion 58. Collating tab 54 is a substantially solid body having a rounded distal end 60, and is disposed at a predetermined angle upwardly away from the outer surface of primary arm portion 48 of second arm 14. Collating tab 54 is substantially aligned vertically with opening 36 of first arm 12, and is configured to cooperate with an opening 36 of a first arm 12 of another U-nut 10, when a plurality of U-nuts 10 are connected in a stacked array or collated strip.

In the exemplary preferred embodiment shown, opening 36 is configured as an elongated slot of a specified width, and collating tab 54 is of a width to engage and encounter the side edges of slot shaped opening 36 in an interfering relationship, so that a collating tab 54 of one U-nut fastener 10 can be connected to a slot opening 36 of another U-nut fastener 10 for engaging the U-nut fasteners in interlocking relationship. While the elongated slot as shown is a preferred structure, it should be understood that other shapes and configurations for both opening 36 and collating tab 54 also can be used.

With reference now being made to FIG. 2, U-nut fasteners 10, 10A constructed in accordance with the principles and teachings of the present invention are shown nested or stacked together in a vertical array or collated strip. It is to be understood, however, that while FIG. 2 shows only a pair of stacked or nested U-nut fasteners 10, 10A, such is strictly for illustrative purposes only in order to disclose the various structural features characteristic of the U-nut fastener constructed in accordance with the principles and teachings of the present invention, and to additionally illustrate how such structural features of the U-nut fasteners 10 enable stacking or nesting in a vertical array or collated strip.

To form a stacked array or collated strip 100 of U-nut fasteners, one U-nut fastener 10 is brought into alignment with a second U-nut fastener 10A such that the internally threaded nut members 40, 40A thereof are substantially aligned. Nut member 40 of U-nut fastener 10 is inserted through annular hoop member 18A of U-nut fastener 10A. Collating tab 54 extends into and through opening 36A, and engages the side edge surfaces of opening 36A. The connecting structure of collating tab 54 and opening 36 are sized and configured with respect to one another such that a collating tab 54 of one U-nut 10 and an opening 36 from an adjacent U-nut 10 cooperatively engage one with the other to inhibit separation of the adjacent U-nuts. Accordingly, in the exemplary embodiment shown, collating tab 54 of U-nut 10 cooperatively engages with opening 36A of U-nut 10A, to secure U-nut 10 and U-nut 10A together. Inclined latch projection 52 is positioned within recessed cutout region 28A so that projections 32A, 34A are disposed along opposite sides of inclined latch projection 52. Accordingly, lateral shifting or twisting of U-nut fasteners 10, 10A relative to one another is restricted by projection 52 extending into recessed cutout region 28A, as well as by collating tab 54 disposed in opening 36A. Further, the engagement of one U-nut 10 against an adjacent U-nut 10A at opposite edges thereof maintains the desired parallel relationship between the U-nuts in a collated strip 100 thereof, while also maintaining the desired spaced relationship between the U-nut fasteners to permit a suitable installation tool to separate individual U-nuts from the collated strip during an installation process.

Connecting structures whereby adjacent U-nut fasteners 10 can be connected into a stacked array or collated strap are provided along opposite ends of the fasteners, and include the connecting structures of collating tabs 54 and openings 36 of adjacent fasteners as well as the connecting structures of latch projections 52 and recessed cutout regions 28 of adjacent fasteners. Accordingly, the stacked array or collated strip of fasteners is rotationally stable as well as securely connected. Providing opening 36 as an elongated slot allows axial adjustment between adjacent fasteners 10 so that a collated strip or stacked array thereof can be maintained in a straight configuration for use in a tool magazine.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A U-nut fastener connectable within a stacked array of U-nut fasteners, comprising:

a first arm; a second arm and a folded edge portion integrally interconnecting said first arm and said second arm such that said first arm, said second arm and said edge portion together provide said fastener with a U-shaped configuration;

a retainer ring integrally formed upon said first arm;

an upstanding nut member integrally formed upon said second arm; and connecting structure provided upon said U-nut fastener for enabling a first U-nut fastener to be lockingly nested together with a second U-nut fastener in a stacked array, including first structure defined upon said first arm and second structure defined upon said second arm for locked accommodation of a first U-nut fastener to a second U-nut fastener in a stacked array when said first structure of a first U-nut fastener is lockingly engaged with said second structure of a second U-nut fastener, said connecting structure comprising:

said first arm defining an opening; and said second arm defining an angled collating tab, said angled collating tab substantially aligned with said opening so that a stacked array of such U-nut fasteners includes said collating tab of one said U-nut fastener extending into said opening of an adjacent said U-nut fastener and being lockingly engaged therewith, wherein said opening is provided in said first arm between said retainer ring and said folded edge portion.

2. The U-nut fastener of claim 1, said collating tab disposed between said upstanding nut member and said folded edge portion.

3. The U-nut fastener of claim 1, including further connecting structure defined at distal end portions of said first and second arms.

4. The U-nut fastener of claim 3, said collating tab disposed between said upstanding nut member and said folded edge portion.

5. The U-nut fastener of claim 3, said first arm having a recessed cutout region at the distal end portion of said first arm, and said second arm having a latch projection at the distal end portion of said second arm.

6. The U-nut fastener of claim 1, said opening being an elongated slot.

7. A U-nut fastener connectable within a stacked array of U-nut fasteners, comprising:

a first arm; a second arm and a folded edge portion integrally interconnecting said first arm and said second arm such that said first arm, said second arm and said edge portion together provide said fastener with a U-shaped configuration;

a retainer ring integrally formed upon said first arm;

an upstanding nut member integrally formed upon said second arm; and cooperating connecting structures provided upon said first and second arms for enabling a first U-nut fastener to be lockingly nested together with a second U-nut fastener in a stacked array, said connecting structures including structures defined at distal outer ends of said first and second arms, an opening defined in one of said arms, and a collating tab extending angularly from the other of said arms, said collating tab defined in said second arm between said nut member and said folded edge portion.

8. The U-nut fastener of claim 7, one of said first and second arms defining a recessed cutout region at the distal edge thereof and the other of said first and second arms defining a latch projection at the distal end thereof.

9. The U-nut fastener of claim 7, said opening defined in said first arm between said retainer ring and said folded edge portion.

10. The U-nut fastener of claim 7, said opening being an elongated slot.

11. A stacked array of U-nut fasteners, comprising:

a first U-nut fastener and a second U-nut fastener lockingly nested together;

each one of said first and second U-nut fasteners having a first arm, a second arm and a folded edge portion integrally interconnecting said first arm thereof and said second arm thereof such that said first arm, said second arm and said folded edge portion together provide said fastener with a U-shaped configuration;

each one of said first and second U-nut fasteners having a threaded nut member in one of said first and second arms thereof and an aperture in the other of said first and second arms thereof aligned with said nut member thereof;

one of said first and second arms of each of said first and second U-nut fasteners including a recessed cutout region at a distal end portion thereof, the other of said first and second arms of each of said first and second U-nut fasteners including an angular latch projection at a distal end portion thereof;

an opening defined in said first arm of said first U-nut fastener; and a collating tab extending angularly from said second arm of said second U-nut fastener, said collating tab being lockingly received in said opening of said first U-nut fastener.

12. The stacked array of claim 11, each one of said first and second U-nut fasteners having a collating tab extending angularly from said second arm thereof and a said opening defined in said first arm thereof.

13. The stacked array of claim 11 each one of said first and second U-nut fasteners having a collating tab extending angularly from said second arm thereof between said threaded nut member and said folded edge portion.

14. The stacked array of claim 11, each one of said first and second U-nut fasteners having a retainer ring defined in said first arm thereof, and a said opening defined in said first arm thereof between said retainer ring thereof and said folded edge portion.

15. The stacked array of claim 11, said opening being an elongated slot.

\* \* \* \* \*